United States Patent Office 2,732,380
Patented Jan. 24, 1956

2,732,380

PROCESS FOR THE PRODUCTION OF 2.4-DITHIO-5.5 - HEPTAMETHYLENE - SPIROHYDANTOIN AND PRODUCT

Walter Reppe and Otto Schlichting, Ludwigshafen (Rhine), Franz Westphal, Ludwigshafen (Rhine-Oppau), and August Amann, Ludwigshafen (Rhine), Germany, assignors to Badische Anilin- & Soda-Fabrik Aktiengesellschaft, Ludwigshafen (Rhine), Germany No Drawing. Application July 26, 1954,
Serial No. 445,904

Claims priority, application Germany July 31, 1953

3 Claims. (Cl. 260—309.5)

This invention relates to a process for the production of 2,4-dithio-5,5-heptamethylenespirohydantoin.

It is already known that dithiohydantoins are obtained by reacting ketones with alkali cyanides, carbon disulfide and ammonium salts. Many of these dithiohydantoins have pharmacological actions.

We have now found that a hitherto unknown dithiospirohydantoin which is especially valuable therapeutically is obtained by using cyclo-octanone as the ketone.

The reaction of the cyclo-octanone with alkali cyanide, as for example sodium cyanide or potassium cyanide, and ammonium salts, such as ammonium chloride, ammonium sulfate, ammonium carbonate or ammonium bicarbonate, takes place at ordinary temperature up to 150° C. especially at elevated temperature, as for example at 60° to 150° C., if desired in solvents. Excess pressures of 1 to 50 atmospheres may be used, if desired by pressing in an inert gas. It is advantageous to work at about 10 to 20 atmospheres and at temperature of 100° to 120° C.

Suitable solvents are organic substances miscible with water and containing no carbonyl groups. For example monohydric or polyhydric alcohols, such as methanol, ethanol, propanol, ethylene glycol, propylene glycol, and also ethers, such as dioxane or tetrahydrofurane, or carboxylic acid amides, as for example acetamide, are especially suitable.

The new 2.4-dithio-5,5-heptamethylenespirohydantoin is insoluble in water. It may however be readily converted into water-soluble salts in the usual manner with alkali alcoholates, alkali hydroxides or organic bases.

These water-soluble salts have excellent anti-epileptic properties and are considerably less poisonous than the known compounds of similar constitution. With the usual experimental animals it also has a strong antispasmodic activity against the extensor cramp occasioned by pentamethylenetetrazole. This property is present only to quite a small extent in the hydantoins hitherto known.

The following example will further illustrate this invention but the invention is not restricted to this example. The parts are parts by weight.

Example

A mixture of 25 parts of cyclo-octanone, 11 parts of sodium cyanide, 12 parts of ammonium chloride, 17 parts of carbon disulfide, 40 parts of alcohol and 15 parts of water is heated in an autoclave for 9 hours at 80° to 90° C. Alcohol, excess carbon disulfide and unconverted ketone are removed from the reaction product by steam distillation. The aqueous alkaline solution, after cooling, is acidified with dilute hydrochloric acid, the crude 2.4-dithio-5.5-cycloheptamethylenespirohydantoin thereby being precipitated. It is filtered off by suction, dissolved in acetone, boiled with active carbon filtered while hot and a little water added to the filtrate. After cooling, the 2.4-dithio-5.5-cycloheptamethylenespirohydantoin crystallises out in pale yellow needles which melt at 262° to 263.5° C. The yield amounts to 19.5 parts.

What we claim is:

1. The 2,4-dithio-5.5-heptamethylenespirohydantoin of the formula:

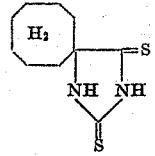

2. A process for the production of 2.4-dithio-5.5-heptamethylenespirohydantoin which comprises causing cyclooctanone to react with at least equivalent amounts of an alkali metal cyanide, an ammonium salt selected from the group consisting of ammonium chloride, sulfate, bicarbonate and carbon disulfide at from ordinary temperature up to about 150° C.

3. A process for the production of 2.4-dithio-5.5-heptamethylenespirohydantoin which comprises causing cyclooctanone to react with at least equivalent amounts of sodium cyanide, ammonium chloride and carbon disulfide at from about 80° to 90° C. under a pressure between normal and 50 atmospheres in the presence of an inert solvent selected from the group consisting of monohydric and polyhydric alcohols, ethers, dioxane, tetrahydrofurane and lower carboxylic acid amides.

References Cited in the file of this patent

FOREIGN PATENTS 512,629     Great Britain            Sept. 21, 1939

OTHER REFERENCES

Tiffeneau et al.: Chem. Abstracts, vol. 42, col. 1206 (1948).

Hazard: Chem. Abstracts, vol. 43, cols. 4585–6 (1949).